(12) United States Patent
Yin et al.

(10) Patent No.: US 11,237,670 B2
(45) Date of Patent: Feb. 1, 2022

(54) TOUCH PANEL, METHOD FOR MANUFACTURING TOUCH PANEL, AND DISPLAY DEVICE

(71) Applicants: HEFEI XINSHENG OPTOELECTRONICS TECHNOLOGY CO., LTD., Hefei (CN); BOE TECHNOLOGY GROUP CO., LTD., Beijing (CN)

(72) Inventors: Li Yin, Beijing (CN); Qingpu Wang, Beijing (CN); Zhi Zhang, Beijing (CN); Bisheng Li, Beijing (CN); Zhenzhong Fang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/825,862

(22) Filed: Mar. 20, 2020

(65) Prior Publication Data
US 2021/0064180 A1    Mar. 4, 2021

(30) Foreign Application Priority Data

Aug. 28, 2019 (CN) .......................... 201910802507.1

(51) Int. Cl.
*G06F 3/041* (2006.01)
*G06F 3/044* (2006.01)
*G02F 1/1333* (2006.01)

(52) U.S. Cl.
CPC .......... *G06F 3/0418* (2013.01); *G06F 3/0445* (2019.05); *G02F 1/13338* (2013.01);
(Continued)

(58) Field of Classification Search
CPC ......... G06F 3/0446; G06F 2203/04111; G06F 2203/04103
See application file for complete search history.

(56) References Cited

U.S. PATENT DOCUMENTS

2011/0261003 A1* 10/2011 Lee .................. G06F 3/0412
345/174
2011/0316567 A1* 12/2011 Chai .................. G06F 3/0445
324/686

(Continued)

*Primary Examiner* — Md Saiful A Siddiqui
(74) *Attorney, Agent, or Firm* — Kinney & Lange, P.A.

(57) ABSTRACT

A touch panel, a method for manufacturing a touch panel, and a display device are provided. The touch panel includes a first transparent electrically conductive layer and a second transparent electrically conductive layer stacked on each other. The first transparent electrically conductive layer includes a first gap region and a first transparent electrically conductive film region. The first gap region and the first transparent electrically conductive film region form a touch sensing electrode pattern. The second transparent electrically conductive layer includes a second gap region and a second transparent electrically conductive film region. The second transparent electrically conductive film region and the second gap region form a shielding pattern. A position of the second transparent electrically conductive film region on the second transparent electrically conductive layer corresponds to a position of the first gap region on the first transparent electrically conductive layer.

18 Claims, 4 Drawing Sheets

(52) U.S. Cl.
CPC .............. *G06F 2203/04103* (2013.01); *G06F 2203/04107* (2013.01)

(56) References Cited

U.S. PATENT DOCUMENTS

| | | | |
|---|---|---|---|
| 2012/0229417 A1* | 9/2012 | Badaye | G06F 3/0443 345/174 |
| 2013/0207923 A1* | 8/2013 | Mohindra | G06F 3/0446 345/174 |
| 2014/0333572 A1* | 11/2014 | Hu | G06F 3/04184 345/174 |
| 2015/0160754 A1* | 6/2015 | Wenzel | G06F 3/0445 345/174 |
| 2016/0378224 A1* | 12/2016 | Kwon | G06F 3/044 345/174 |
| 2017/0277308 A1* | 9/2017 | Zeng | G06F 3/0446 |

* cited by examiner

| | |
|---|---|
| forming a first gap region and a first transparent electrically conductive film region on a base substrate to form a first transparent electrically conductive layer having a touch sensing electrode pattern thereon | 501 |
| providing an insulating layer on the first transparent electrically conductive layer | 502 |
| forming a second gap region and a second transparent electrically conductive film region on the insulating layer by one patterning process to form a second transparent electrically conductive layer having a bridge portion and a shielding pattern thereon | 503 |

FIG. 5

TOUCH PANEL, METHOD FOR MANUFACTURING TOUCH PANEL, AND DISPLAY DEVICE

CROSS-REFERENCE TO RELATED APPLICATION

This application claims priority of Chinese Patent Application No. 201910802507.1 filed on Aug. 28, 2019 in China National Intellectual Property Administration, the disclosure of which is incorporated herein by reference in entirety.

BACKGROUND

The present disclosure relates generally to the field of display technology, and more particularly, to touch panels and method for manufacturing touch panels and display devices.

Present trends have add-on touch screen becoming thinner, demanding that the distance between touch sensing electrodes and LCD (Liquid Crystal Display) driving components also shrink.

SUMMARY

According to an aspect of the present disclosure, there is provided a touch panel, comprising a first transparent electrically conductive layer and a second transparent electrically conductive layer stacked on each other, wherein the first transparent electrically conductive layer comprises a first gap region and a first transparent electrically conductive film region, the first gap region and the first transparent electrically conductive film region forming a touch sensing electrode pattern, wherein the second transparent electrically conductive layer comprises a second gap region and a second transparent electrically conductive film region, the second transparent electrically conductive film region and the second gap region forming a shielding pattern, wherein a position of the second transparent electrically conductive film region on the second transparent electrically conductive layer corresponds to a position of the first gap region on the first transparent electrically conductive layer.

According to some embodiments of the present disclosure, an orthographic projection of the second transparent electrically conductive film region on the first transparent electrically conductive layer completely covers the first gap region.

According to some embodiments of the present disclosure, the first transparent electrically conductive film region is divided into a first electrode and a second electrode by the first gap region, the first electrode comprises two first sub-electrodes which are electrically conductively connected to each other, and the second electrode comprises two second sub-electrodes separated from each other by an insulating isolation region.

According to some embodiments of the present disclosure, a transparent electrically conductive film in the second transparent electrically conductive film region comprises a bridge portion for connecting the two second sub-electrodes in the first transparent electrically conductive film region which are insulated from each other.

According to some embodiments of the present disclosure, an orthographic projection of the bridge portion on the first transparent electrically conductive layer covers the insulating isolation region.

According to some embodiments of the present disclosure, the bridge portion comprises a horizontal portion and two extension portions extending toward the first transparent electrically conductive layer along ends of the horizontal portion, an orthographic projection of the horizontal portion on the first transparent electrically conductive layer covers the insulating isolation region, and the two extension portions are in contact with the two second sub-electrodes, respectively.

According to some embodiments of the present disclosure, an insulating layer is provided between the first transparent electrically conductive layer and the second transparent electrically conductive layer, and an orthographic project of the insulating layer on the second transparent electrically conductive layer covers the horizontal portion of the bridge portion.

According to some embodiments of the present disclosure, the first transparent electrically conductive film region and the second transparent electrically conductive film region each comprise an indium tin oxide film.

According to some embodiments of the present disclosure, the bridge portion is insulated from a portion of the second transparent electrically conductive film region other than the bridge portion.

According to some embodiments of the present disclosure, the portion of the second transparent electrically conductive film region other than the bridge portion is configured to be grounded.

According to some embodiments of the present disclosure, the touch panel further comprises a display layer, the first transparent electrically conductive layer or the second transparent electrically conductive layer is adhered to a surface of the display layer.

According to some embodiments of the present disclosure, the first sub-electrodes and the second sub-electrodes are each substantially triangular or substantially quadrangular.

According to some embodiments of the present disclosure, the touch panel further comprises an additional insulating layer disposed on a side of the second transparent electrically conductive layer away from the first transparent electrically conductive layer.

According to another aspect of the present disclosure, there is provided a method for manufacturing a touch panel, comprising:

forming a first gap region and a first transparent electrically conductive film region on a base substrate to form a first transparent electrically conductive layer having a touch sensing electrode pattern; and forming a second gap region and a second transparent electrically conductive film region on the first transparent electrically conductive layer by one patterning process, to form a second transparent electrically conductive layer having a shielding pattern, wherein a position of the second transparent electrically conductive film region on the second transparent electrically conductive layer corresponds to a position of the first gap region on the first transparent electrically conductive layer.

According to some embodiments of the present disclosure, before forming the second transparent electrically conductive layer, the method further comprises: forming an insulating layer on the first transparent electrically conductive layer, wherein the second transparent electrically conductive layer is formed on the insulating layer.

According to some embodiments of the present disclosure, the method further comprises: forming an additional insulating layer on a side of the second transparent electrically conductive layer away from the first transparent electrically conductive layer.

According to some embodiments of the present disclosure, a transparent electrically conductive film in the second transparent electrically conductive film region comprises a bridge portion for connecting two sub-electrodes in the first transparent electrically conductive film region which are insulated from each other.

According to some embodiments of the present disclosure, the method further comprises: grounding a portion of the second transparent electrically conductive film region other than the bridge portion, wherein the bridge portion is insulated from the portion of the second transparent electrically conductive film region other than the bridge portion.

According to a further aspect of the present disclosure, there is provided a display device, comprising the touch panel according to any one of the above embodiments.

The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION OF EMBODIMENTS

The present disclosure is described in detail below. Embodiments are presented below, in combination with the figures, in order to more clearly describe the technical solutions of the present disclosure. The drawings and the following description provide only exemplary embodiments of these technical solutions, and further embodiments may be obtained by those skilled in the art based on the present disclosure without any creative efforts. In order to make the objectives, technical solutions, and advantages of the present disclosure more clear, the present disclosure will be further described in detail below with reference to specific embodiments in combination with the accompanying drawings. The embodiments described below with reference to the drawings are exemplary, and are only used to explain the present disclosure, and should not be construed as limiting the present disclosure.

It should be noted that all the expressions with "first" or "second" in the embodiments of the present disclosure are intended for distinguishing between two different entities or parameters with the same name. It can be seen that the term "first" or "second" is merely intended for convenience of expression, and should not be construed as limiting the embodiments of the present disclosure, which will not be explained again in subsequent embodiments.

The distance between the touch sensing electrode and the driving component of the LCD (Liquid Crystal Display) in new display device continues to shrink, increasing the probability of signal coupling between the touch sensing electrode and the driving component, i.e., causing the LCD noise to more seriously interfere with the touch screen signal. This interference can cause mis-touch, burst point, disconnection, or the like.

For example, the add-on touch screen is generally affected by the noise generated by the LCD fitted with it. It is necessary to provide a deflection voltage for the liquid crystal molecules to rotate, the voltage supply methods may be divided into DC VCOM (direct current common voltage) supply method and AC VCOM (alternating current common voltage) supply method. The AC VCOM supply method is typically used. In the related art, capacitive screens are generally divided into two kinds: SITO (single-sided ITO, single-sided electrically conductive) structure and DITO (double-sided ITO, double-sided electrically conductive) structure. For the capacitive screen with SITO structure, it generally requires the addition of a shielding layer behind the capacitive screen when it is manufactured, so that the SITO screen can be directly attached to the LCD surface without being affected by the LCD. For the capacitive screen with DITO structure, it has no shielding layer when it is manufactured. If it is directly attached to the LCD surface, it will be easily affected by the AC VCOM of the LCD. Since an AC operation mode is adopted in such a capacitive screen, the two AC electric fields will interfere with each other. The closer the frequencies are, the more serious the interference is. Moreover, what the touch sensing electrode of the capacitive screen receives is a weak signal. Therefore, the interference of the AC VCOM of the LCD to the touch sensing electrode will significantly affect the signal received by the touch sensing electrode.

In view of this, the embodiments of the present disclosure propose a touch panel, a method for manufacturing a touch panel, and a display device, so as to solve the problem that the LCD noise seriously interferes with the signal of the touch screen in the related art.

Figure 1:
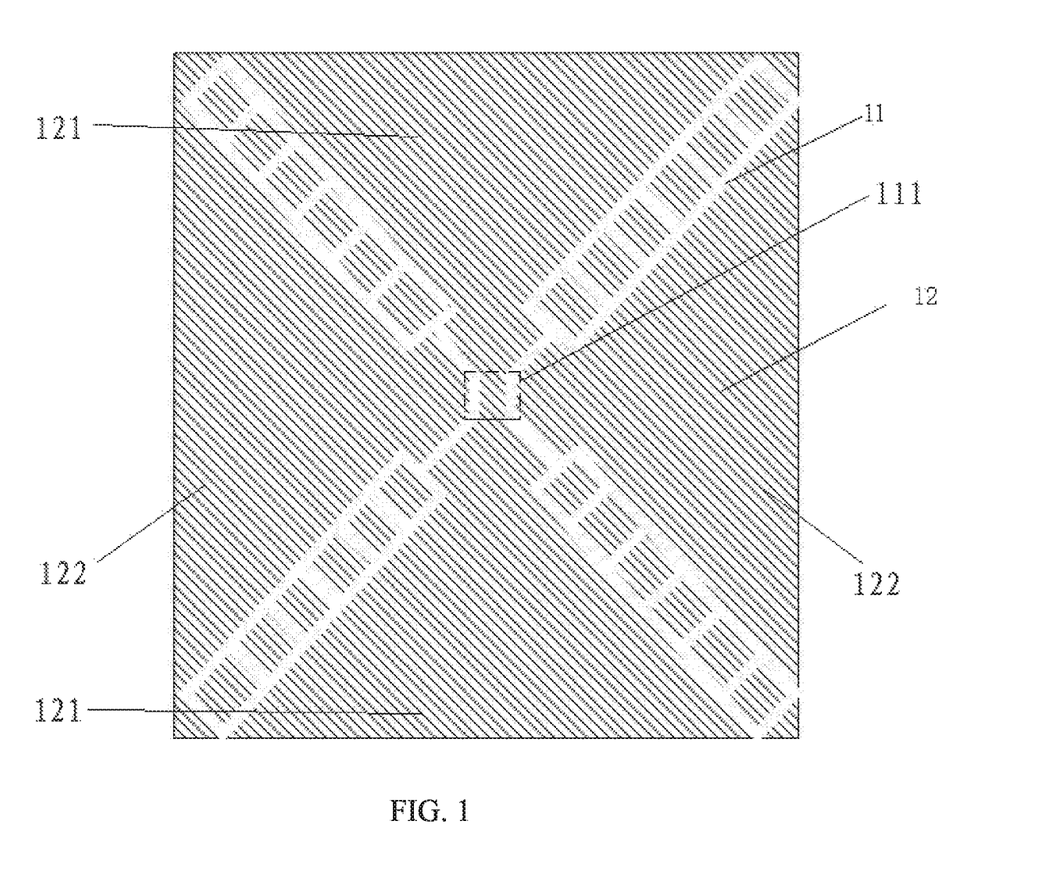
FIG. 1 is a schematic view of a first transparent electrically conductive layer according to an exemplary embodiment of the present disclosure.
Figure 2:
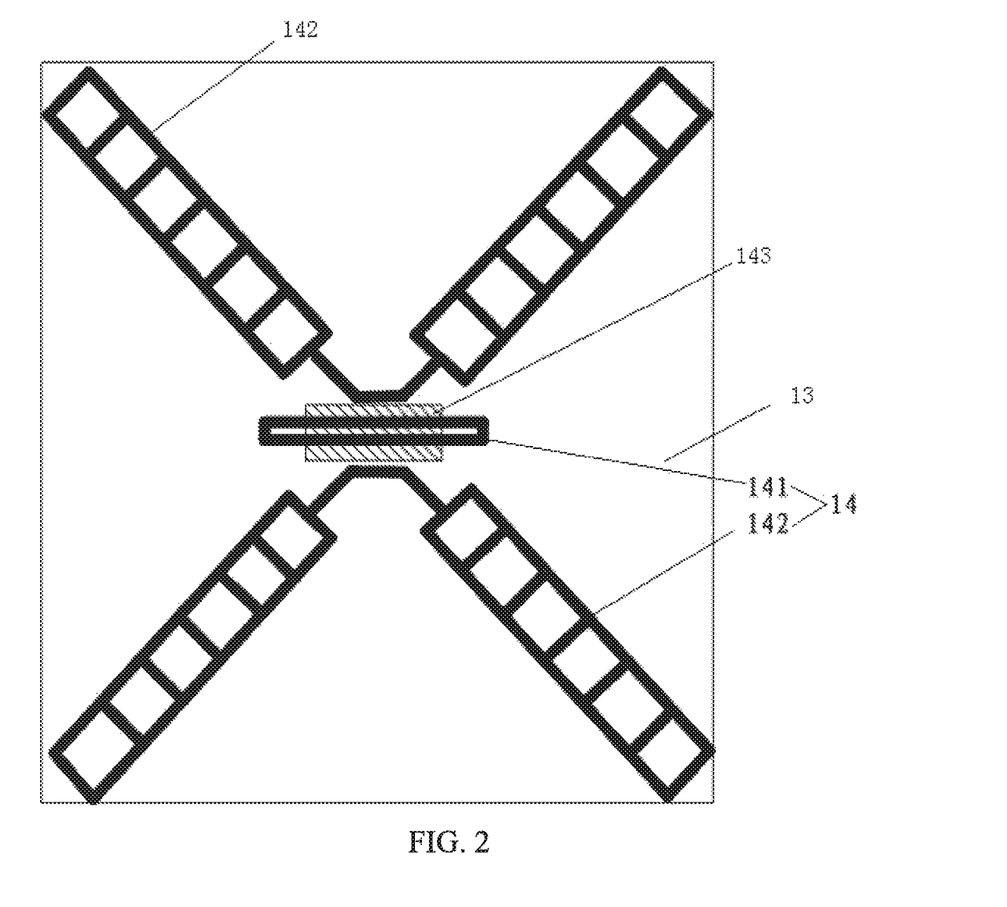
FIG. 2 is a schematic view of a second transparent electrically conductive layer according to an exemplary embodiment of the present disclosure.

In an embodiment of the present disclosure, it provides a touch panel including: a first transparent electrically conductive layer and a second transparent electrically conductive layer which are oppositely disposed. As shown in FIG. 1, the first transparent electrically conductive layer has a first gap region 11 and a first transparent electrically conductive film region 12, the first gap region 11 and the first transparent electrically conductive film region 12 form a touch sensing electrode pattern. The first gap region 11 divides the first transparent electrically conductive film region 12 into a first electrode 121 and a second electrode 122, the first electrode 121 includes two parts (two first sub-electrodes) that are electrically conductively connected to each other, the second electrode 122 is divided into two independent parts (two second sub-electrodes) by an insulating isolation region 111. As shown in FIG. 2, the second transparent electrically conductive layer has a second gap region 13 and a second transparent electrically conductive film region 14. The second transparent electrically conductive film region 14 forms a bridge portion 141 and a shielding pattern 142. When the second transparent electrically conductive layer is disposed on the first transparent electrically conductive layer, an orthographic projection of the bridge portion 141 on the first transparent electrically conductive layer covers the insulating isolation region 111 of the first transparent electrically conductive layer. Two ends of the bridge portion 141 are respectively connected to the two independent parts of the second electrode 122 (see FIG. 4 described later), so that the two independent parts of the second electrode 122 are electrically connected to each other. An insulating layer disposed between the first transparent electrically conductive layer and the second transparent electrically conductive layer is used to insulate the first electrode 121 from the second electrode 122. FIG. 2 shows an orthographic projection 143 of the insulating layer on the second transparent electrically conductive layer.

The position of the second transparent electrically conductive film region 14 on the second transparent electrically conductive layer corresponds to the position of the first gap region 11 on the first transparent electrically conductive layer.

The first transparent electrically conductive film region 12 and the second transparent electrically conductive film region 14 refer to regions having transparent electrically conductive films, and the first gap region 11 and the second gap region 13 refer to regions on which no transparent electrically conductive film is provided.

The position of the second transparent electrically conductive film region 14 on the second transparent electrically conductive layer corresponds to the position of the first gap region 11 on the first transparent electrically conductive layer. For example, an orthographic projection of the second transparent electrically conductive film region 14 on the first transparent electrically conductive layer completely or partially covers the first gap region 11, so that the second transparent electrically conductive film region 14 can completely or partially shield the first gap region 11.

Further, the position of the second gap region 13 of the second transparent electrically conductive layer on the second transparent electrically conductive layer substantially corresponds to the position of the first transparent electrically conductive film region 12 on the first transparent electrically conductive layer. For example, an orthographic projection of the second gap region 13 on the first transparent electrically conductive layer partially or completely covers the first transparent electrically conductive film region 12.

More specifically, the position of the shielding pattern 142 of the second transparent electrically conductive film region 14 on the second transparent electrically conductive layer corresponds to the position of the first gap region 11 on the first transparent electrically conductive layer. For example, an orthographic projection of the shielding pattern 142 on the first transparent electrically conductive layer partially or completely covers the first gap region 11. The position of the bridge portion 141 of the second transparent electrically conductive film region 14 on the second transparent electrically conductive layer corresponds to the position of the insulating isolation region 111 on the first transparent electrically conductive layer. For example, an orthographic projection of the bridge portion 141 on the first transparent electrically conductive layer partially or entirely covers the insulating isolation region 111.

It should be noted that FIG. 1 only shows an exemplary structure of one touch sensing electrode in the touch panel according to the embodiments of the present disclosure. The touch panel according to the embodiments of the present disclosure may include an array of touch sensing electrodes shown in FIG. 1. The bridge portions in various touch sensing electrodes are used for electrically connecting the touch sensing electrodes in the same row or the same column. The touch sensing electrode pattern is not limited to the pattern formed by the first gap region 11 and the first transparent electrically conductive film region 12, and it may be other patterns.

It should be noted that the structures of the first electrode 121 and the second electrode 122 shown in FIG. 1 only represent an example of the touch sensing electrode in the embodiments of the present disclosure. In another implementation mode of the present disclosure, the first electrode 121 may be divided into two independent parts by an insulating isolation region, and the second electrode 122 may include two parts that are electrically conductively connected to each other. In this case, the bridge portion is used to electrically conductively connect the two independent parts of the first electrode 121 to each other, and the shape of the bridge portion will change accordingly. For example, the shape of the bridge portion may be configured in such a way that its orthographic projection on the first transparent electrically conductive layer covers the insulating isolation region. In addition, the first electrode and the second electrode may have shapes other than the shape shown in FIG. 1. For example, a plurality of rectangular structures may be formed by the division of a gap region to form the first electrode and the second electrode.

In the related art, the second transparent electrically conductive layer only includes a bridge portion. In the touch panel according to the embodiments of the present disclosure, a shielding pattern is provided on the second transparent electrically conductive layer which is originally used to provide only the bridge portion, and the position of the transparent electrically conductive film in the shielding pattern corresponds to the position of the gap region in the touch sensing electrode pattern, so that the shielding pattern can play a role of covering the gap region in the touch sensing electrode pattern. Based on this, viewed from the front or back of the touch sensing electrode pattern, the visible region of the touch sensing electrode is all be filled, which solves the problem of shadow elimination of pattern due to a large difference in reflectance between the transparent electrically conductive film region and the gap region in the first transparent electrically conductive layer.

In one embodiment, the touch panel according to the embodiments of the present disclosure may be applied to an add-on touch display device. If the touch panel is directly attached to the LCD surface of the display device, it is easily affected by the deflection voltage AC VCOM of the LCD. Two alternating electric fields of the touch layer and the display layer will interfere with each other. The closer the frequencies are, the more serious the interference is. Since what the touch sensing electrode originally received is a weak signal, the interference between the touch layer and the display layer needs to be reduced, so that the touch layer can more sensitively detect touch signals. Based on this, in the case where the touch panel according to the embodiments of the present disclosure is applied to an add-on touch device, the second transparent electrically conductive layer may act as a shielding layer between the display layer and the touch layer of the display device, to shield the LCD noise from interfering with the signal received by the touch sensing electrode. Therefore, the noise interference is reduced, the signal-to-noise ratio is improved, and the limit on the height of the finger in a floating touch operation is reduced. At the same time, the problem of burst point caused by the LCD noise in the frame attachment technology may be effectively improved. Moreover, there is no need to add a special process for the shielding layer provided between the display layer and the touch layer, which simplifies the manufacturing process of the touch panel.

In an embodiment as shown by the first transparent electrically conductive layer in FIG. 1 and the second transparent electrically conductive layer in FIG. 2, orthographic projections of the shielding pattern 142 and the bridge portion 141 on the first transparent electrically conductive layer completely cover an orthographic projection of the first gap region on the second transparent electrically conductive layer. In this way, the shielding pattern 142 and the bridge portion 141 in the second transparent electrically conductive layer can completely shield the gap region 11 in the first transparent electrically conductive layer.

Figure 3:
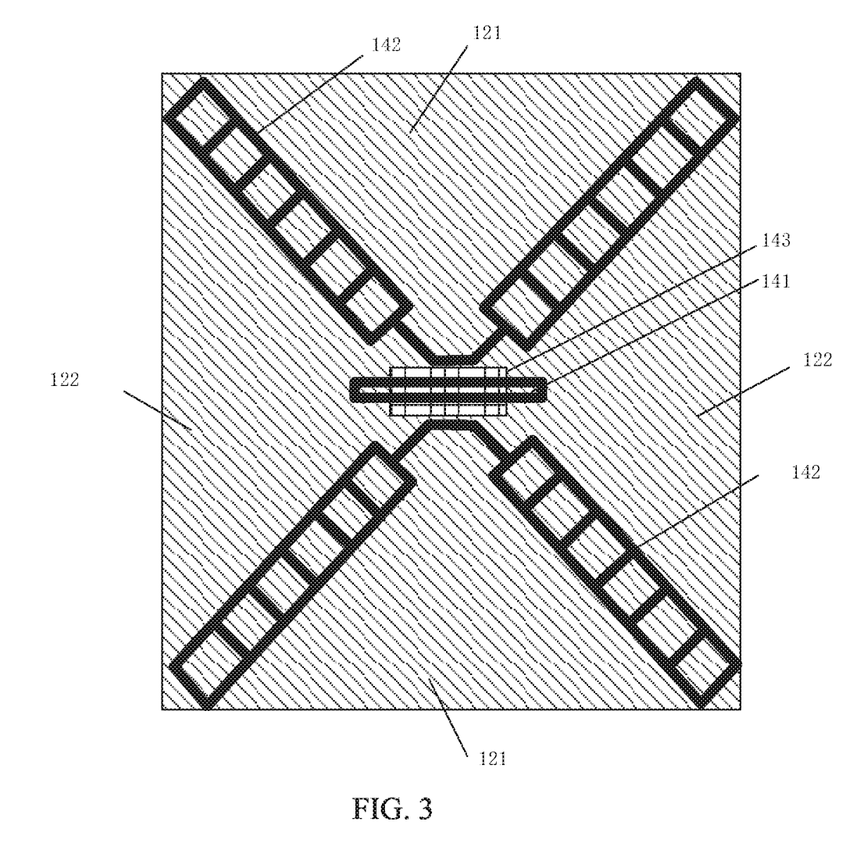
FIG. 3 is a schematic view illustrating that a second transparent electrically conductive layer is disposed on a first transparent electrically conductive layer according to an exemplary embodiment of the present disclosure.

FIG. 3 specifically shows the combination of the second transparent electrically conductive layer and the first transparent electrically conductive layer, here the second transparent electrically conductive layer is disposed on the first transparent electrically conductive layer, and the correspondence between the second transparent electrically conductive film region and the first gap can be seen from the figure.

Figure 4A:
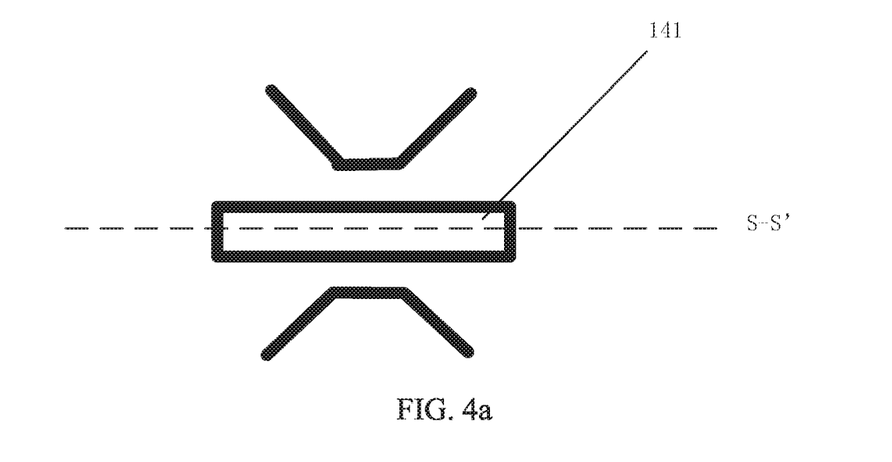
FIG. 4a is a schematic view of a region where a bridge portion is located on a second transparent electrically conductive layer according to an exemplary embodiment of the present disclosure.
Figure 4B:
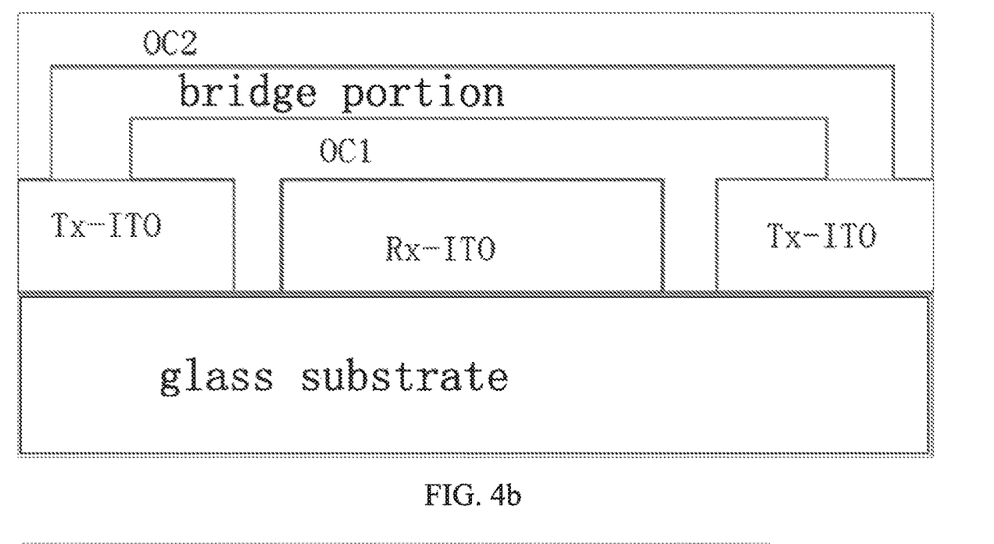
FIG. 4b is a schematic cross-sectional view of the region where the bridge portion is located along a cutting line S-S' in FIG. 4a according to the exemplary embodiment.

In some embodiments, the bridge portion includes a horizontal portion and two extension portions extending toward the first transparent electrically conductive layer along ends of the horizontal portion, an orthographic projection of the horizontal portion on the first transparent electrically conductive layer covers the isolation region, and the two extension portions are in contact with the two independent parts of the second electrode, respectively. The structure of the bridge portion will be described below with reference to FIG. 4a and FIG. 4b. FIG. 4a is a schematic view of a region where the bridge portion is located on the second transparent electrically conductive layer, in which the second transparent electrically conductive layer is disposed on the first transparent electrically conductive layer, FIG. 4b is a schematic cross-sectional view of the region where the bridge portion is located along a cutting line S-S' in FIG. 4a, showing a combination of the first transparent electrically conductive layer and the second transparent electrically conductive layer. As shown in FIG. 4b, Tx-ITO patterns and Rx-ITO patterns are attached to a glass substrate, an insulating layer OC1 is attached to the Tx-ITO patterns and the Rx-ITO patterns, and the bridge portion is attached to the insulating layer OC1. The bridge portion is of a bridge-shaped structure, the horizontal portion of the bridge-shaped structure is attached to the Tx-ITO patterns and the Rx-ITO patterns, the vertical portions at both ends thereof are in contact with the two Tx-ITO patterns on the first transparent electrically conductive layer, to form an electrical connection between the two Tx-ITO patterns. The insulating layer OC1 located below the horizontal portion of the bridge portion allows the bridge portion to be insulated from the Rx-ITO pattern shown in FIG. 4b, to insulate the Tx-ITO patterns from the Rx-ITO pattern. OC2 is another insulating layer attached to the bridge portion for protecting the bridge portion. Here, the Rx-ITO pattern corresponds to the first electrode, and the Tx-ITO pattern corresponds to the second electrode.

In one embodiment, indium tin oxide (ITO) films are formed in the first transparent electrically conductive film region and the second transparent electrically conductive film region, and the films enables the first transparent electrically conductive layer and the second transparent electrically conductive layer to have better resistivity and translucency. In addition, the electrically conductive films of the first transparent electrically conductive layer and the second transparent electrically conductive layer may be indium tin oxide films.

In some embodiments, the bridge portion and the shielding pattern are insulated from each other. Again, with the second transparent electrically conductive layer shown in FIG. 2 taken as an example, there is provided a gap region between the bridge portion 141 and the shielding pattern 142 to realize the insulation of the bridge portion from the shielding pattern. Based on this, it can prevent the shielding pattern from affecting the bridge portion of the first transparent electrically conductive layer.

In further embodiments, an insulating layer is provided between the first transparent electrically conductive layer and the second transparent electrically conductive layer, and an orthographic projection of the insulating layer on the second transparent electrically conductive layer covers the horizontal portion of the bridge portion. As shown in FIGS. 2 and 3, the orthographic projection 143 of the insulating layer on the second transparent electrically conductive layer covers a middle portion of the bridge portion 141 but does not cover two ends of the bridge portion 141, so that the two ends of the bridge portion 141 may be in contact with the two independent insulated parts of the second electrode 122 in the first transparent electrically conductive layer shown in FIG. 3, thereby the two parts of the second electrode 122 insulated from each other are electrically connected, and it prevents the bridge portion 141 from electrically connecting the first electrode to the second electrode.

In some embodiments, the touch panel may further include a display layer, and the first transparent electrically conductive layer or the second transparent electrically conductive layer is adhered to a surface of the display layer. That is, the positions of the first transparent electrically conductive layer and the second transparent electrically conductive layer in the touch panel may be interchanged. Based on this, the flexibility of manufacturing the touch panel is improved.

Figure 5:
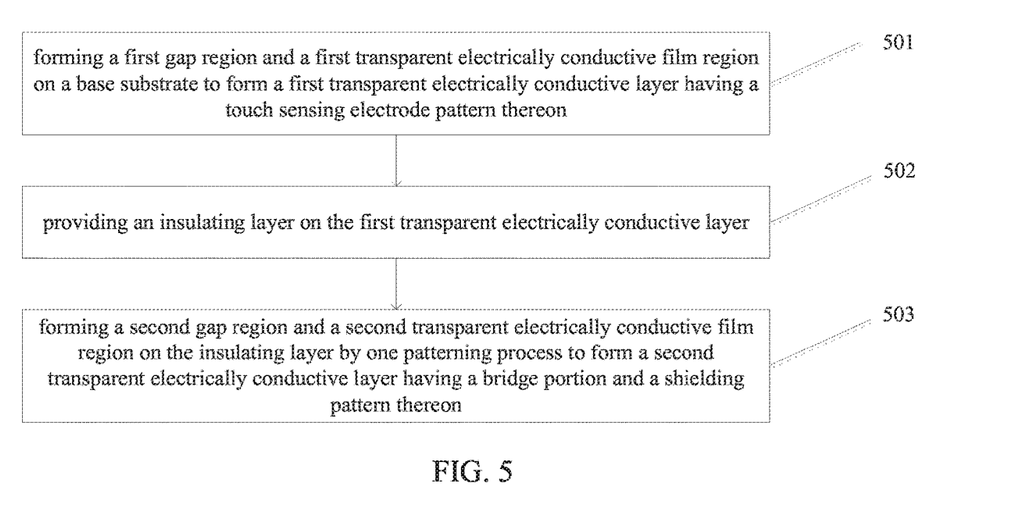
FIG. 5 is a flow chart of a method for manufacturing a touch panel according to an exemplary embodiment of the present disclosure.

In an embodiment of the present disclosure, it further provides a method for manufacturing a touch panel. FIG. 5 is a flowchart of a method for manufacturing a touch panel according to an exemplary embodiment. As shown in FIG. 5, the method includes:

Step 501: forming a first gap region and a first transparent electrically conductive film region on a base substrate to form a first transparent electrically conductive layer having a touch sensing electrode pattern thereon;

Step 502: providing an insulating layer (for example, the insulating layer OC1 shown in FIG. 4b) on the first transparent electrically conductive layer;

Step 503: forming a second gap region and a second transparent electrically conductive film region on the insulating layer by one patterning process to form a second transparent electrically conductive layer having a bridge portion and a shielding pattern thereon, a position of the second transparent electrically conductive film region on the second transparent electrically conductive layer corresponding to a position of the first gap region on the first transparent electrically conductive layer.

In the method for manufacturing the touch panel according to the embodiments of the present disclosure, a bridge portion is formed on the second transparent electrically conductive layer in the process of manufacturing the touch panel, and a shielding pattern corresponding to the position of the first gap region on the first transparent electrically conductive layer is formed simultaneously, so that it allows the shielding pattern to shield the gap region on the first transparent electrically conductive layer, thus viewed from the front or back of the touch sensing electrode pattern, the visible regions of the touch sensing electrode are all be filled, which solves the problem of shadow elimination of pattern due to a large difference in reflectance between the transparent electrically conductive film region and the gap region in the first transparent electrically conductive layer.

As an example, the following describes the method for manufacturing the touch panel according to the embodiments of the present disclosure with reference to FIG. 4b. In this example, the base substrate is a glass plate, a layer of ITO is sputtered on the glass plate by a sputtering process, then ITO patterns (i.e., the Tx-ITO patterns and the Rx-ITO pattern shown in FIG. 4b) are formed by a yellow-light photolithography process; an insulating layer (i.e., the OC1 layer shown in FIG. 4b) is formed by a coating process, and then a small OC1 block is formed by a yellow-light photolithography process; another layer of ITO is sputtered by a sputtering process, and an ITO bridge (an example of the above-mentioned bridge portion) and a shielding pattern are formed by a yellow-light photolithography process, the position of the ITO bridge is right above the small OC1 block, the bottom of the bridge is supported by the small OC1 block, two ends of the bridge electrically connect the Tx-ITO patterns; an insulating layer (i.e., the OC2 layer) is formed by a coating process to protect the bridge.

In an implementable mode, the method for manufacturing the touch panel may further include grounding the shielding pattern. For example, the shielding pattern may be connected to a ground terminal, so that the shielding pattern can serve as shielding layer between the first transparent electrically conductive layer and the second transparent electrically conductive layer. In the case where the touch panel according to the embodiments of the present disclosure is applied to an add-on touch device, the second transparent electrically conductive layer may be used as a shielding layer between the touch layer and the display layer of the display device, to shield the LCD noise from interfering with the signal received by the touch sensing electrode, and there is no need to add a special process for the shielding layer between the display layer and the touch layer.

In an implementable mode, an orthographic projection of the shielding pattern on the first transparent electrically conductive layer coincides with an orthographic projection of the touch sensing electrode pattern on the second transparent electrically conductive layer, so that the shielding pattern 142 in the second transparent electrically conductive layer can completely shield the gap region 11 on the first transparent electrically conductive layer.

In an implementable mode, the bridge portion and the shielding pattern are insulated and isolated from each other. For example, when the second transparent electrically conductive layer is provided on the insulating layer, one patterning process may be used to form the bridge portion 141 and the shielding pattern 142 as shown in FIG. 2 on the second transparent electrically conductive layer. Since there is a gap region between the bridge portion 141 and the shielding pattern 142, the bridge portion 141 and the shielding pattern 142 are insulated from each other, so that the shielding pattern 142 does not affect the bridge portion 141.

In an implementable mode, a sputtering process may be used to form a touch sensing electrode pattern on the base substrate of the first transparent electrically conductive layer and a bridge portion and a shielding pattern on the second transparent electrically conductive layer.

In an embodiment of the present disclosure, it further provides a display device, including the touch panel according to any one of the embodiments of the present disclosure.

It should be appreciated by those skilled in the art that the above embodiments are merely exemplary, but not intended to imply that the scope of the present disclosure (including claims) is limited to these examples. Under the concept of the embodiments of the present disclosure, the above embodiments or the technical features in different embodiments may be combined, the steps may be implemented in any order, and there are many other variations in different aspects of the present disclosure as above, they are not provided in detail for the sake of brevity.

Furthermore, in order to simplify the description and discussion, and in order not to make the present disclosure difficult to be understood, well-known power/ground connections to the chip of the integrated circuit (IC) and other components may or may not be shown in the provided drawings. In addition, the devices may be shown in a block diagram form in order to avoid making the present disclosure difficult to be understood, and it also takes into account the fact that details regarding the implementation of these devices in the block diagrams are highly dependent on the platform on which the present disclosure will be implemented (i.e., these details should be completely understood by those skilled in the art). In the case where specific details (for example, a circuit) are set forth to describe the exemplary embodiments of the present disclosure, it will be apparent to those skilled in the art that the present disclosure may be implemented without these specific details or in the case where these specific details are changed. Therefore, these descriptions should be considered as illustrative but not restrictive.

Although the present disclosure has been described in connection with specific embodiments of the present disclosure, many substitutions, modifications, and variations of these embodiments will be apparent to those skilled in the art from the foregoing description. For example, other memory architectures (for example, dynamic RAM (DRAM)) may be adopted in the embodiments discussed.

The embodiments of the present disclosure are intended to cover all substitutions, modifications, and variations that fall within the broad scope of the appended claims. Therefore, any omissions, modifications, equivalent replacements, improvements, etc. made within the spirit and principle of the present disclosure should be included in the scope of the present disclosure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

The invention claimed is:

1. A touch panel, comprising:
   a first transparent electrically conductive layer; and
   a second transparent electrically conductive layer, wherein the first and second transparent electrically conductive layers are stacked on each other,
   wherein the first transparent electrically conductive layer comprises a first gap region and a first transparent electrically conductive film region, the first gap region and the first transparent electrically conductive film region forming a touch sensing electrode pattern,
   wherein the second transparent electrically conductive layer comprises a second gap region and a second transparent electrically conductive film region, the second transparent electrically conductive film region and the second gap region forming a shielding pattern,
   wherein a position of the second transparent electrically conductive film region on the second transparent electrically conductive layer corresponds to a position of the first gap region on the first transparent electrically conductive layer,
   wherein the first transparent electrically conductive film region is divided into a first electrode and a second electrode by the first gap region, the first electrode comprises two first sub-electrodes which are electrically conductively connected to each other, and the second electrode comprises two second sub-electrodes separated from each other by an insulating isolation region, and
   wherein an orthographic projection of the second gap region on the first transparent electrically conductive layer covers the first electrode and the second electrode.

2. The touch panel according to claim 1, wherein an orthographic projection of the second transparent electrically conductive film region on the first transparent electrically conductive layer completely covers the first gap region.

3. The touch panel according to claim 1, wherein the first transparent electrically conductive film region and the second transparent electrically conductive film region each comprise an indium tin oxide film.

4. The touch panel according to claim 1, wherein the touch panel further comprises a display layer, the first transparent electrically conductive layer or the second transparent electrically conductive layer is adhered to a surface of the display layer.

5. The touch panel according to claim 1, wherein the first sub-electrodes and the second sub-electrodes are each substantially triangular or substantially quadrangular.

6. The touch panel according to claim 1, wherein the touch panel further comprises an additional insulating layer disposed on a side of the second transparent electrically conductive layer away from the first transparent electrically conductive layer.

7. A display device comprising the touch panel according to claim 1.

8. The touch panel according to claim 1, wherein a transparent electrically conductive film in the second transparent electrically conductive film region comprises a bridge portion for connecting the two second sub-electrodes in the first transparent electrically conductive film region which are insulated from each other.

9. The touch panel according to claim 8, wherein an orthographic projection of the bridge portion on the first transparent electrically conductive layer covers the insulating isolation region.

10. The touch panel according to claim 8, wherein the bridge portion comprises a horizontal portion and two extension portions extending toward the first transparent electrically conductive layer along ends of the horizontal portion, an orthographic projection of the horizontal portion on the first transparent electrically conductive layer covers the insulating isolation region, and the two extension portions are in contact with the two second sub-electrodes, respectively.

11. The touch panel according to claim 10, wherein an insulating layer is provided between the first transparent electrically conductive layer and the second transparent electrically conductive layer, and an orthographic project of the insulating layer on the second transparent electrically conductive layer covers the horizontal portion of the bridge portion.

12. The touch panel according to claim 8, wherein the bridge portion is insulated from a portion of the second transparent electrically conductive film region other than the bridge portion.

13. The touch panel according to claim 12, wherein the portion of the second transparent electrically conductive film region other than the bridge portion is configured to be grounded.

14. A method for manufacturing a touch panel, the method comprising:
   forming a first gap region and a first transparent electrically conductive film region on a base substrate to form a first transparent electrically conductive layer having a touch sensing electrode pattern; and
   forming a second gap region and a second transparent electrically conductive film region on the first transparent electrically conductive layer by one patterning process, to form a second transparent electrically conductive layer having a shielding pattern,
   wherein a position of the second transparent electrically conductive film region on the second transparent electrically conductive layer corresponds to a position of the first gap region on the first transparent electrically conductive layer,
   wherein the first transparent electrically conductive film region is divided into a first electrode and a second electrode by the first gap region, the first electrode comprises two first sub-electrodes which are electrically conductively connected to each other, and the second electrode comprises two second sub-electrodes separated from each other by an insulating isolation region, and
   wherein an orthographic projection of the second gap region on the first transparent electrically conductive layer covers the first electrode and the second electrode.

15. The method according to claim 14, wherein before forming the second transparent electrically conductive layer, the method further comprises: forming an insulating layer on the first transparent electrically conductive layer,
   wherein the second transparent electrically conductive layer is formed on the insulating layer.

16. The method according to claim 15, wherein the method further comprises: forming an additional insulating layer on a side of the second transparent electrically conductive layer away from the first transparent electrically conductive layer.

17. The method according to claim 14, wherein a transparent electrically conductive film in the second transparent electrically conductive film region comprises a bridge portion for connecting two sub-electrodes in the first transparent electrically conductive film region which are insulated from each other.

18. The method according to claim 17, wherein the method further comprises:
grounding a portion of the second transparent electrically conductive film region other than the bridge portion,
wherein the bridge portion is insulated from the portion of the second transparent electrically conductive film region other than the bridge portion.

\* \* \* \* \*